US008732308B1

(12) United States Patent
Talwar et al.

(10) Patent No.: US 8,732,308 B1
(45) Date of Patent: May 20, 2014

(54) COORDINATED MANAGEMENT IN VIRTUALIZED SYSTEMS USING MANAGEMENT BROKERS AND MANAGEMENT CHANNELS

(75) Inventors: Vanish Talwar, Palo Alto, CA (US); Jeff S. Autor, Houston, TX (US); Sanjay Kumar, Atlanta, GA (US); Parthasarathy Ranganathan, Fremont, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 1248 days.

(21) Appl. No.: 12/243,111

(22) Filed: Oct. 1, 2008

(51) Int. Cl.
*G06F 15/173* (2006.01)

(52) U.S. Cl.
USPC .......................................................... 709/226

(58) Field of Classification Search
USPC .......................................................... 709/226
See application file for complete search history.

(56) References Cited

U.S. PATENT DOCUMENTS

| | | | | |
|---|---|---|---|---|
| 5,201,049 | A * | 4/1993 | Shorter | 718/1 |
| 6,460,070 | B1 | 10/2002 | Turek et al. | |
| 7,870,153 | B2 * | 1/2011 | Croft et al. | 707/781 |
| 7,949,677 | B2 * | 5/2011 | Croft et al. | 707/781 |
| 8,046,695 | B2 * | 10/2011 | Ye et al. | 715/740 |
| 8,051,180 | B2 * | 11/2011 | Mazzaferri et al. | 709/227 |
| 8,117,314 | B2 * | 2/2012 | Croft et al. | 709/227 |
| 2003/0046396 | A1 | 3/2003 | Richter et al. | |
| 2004/0019668 | A1 | 1/2004 | Kakadia | |
| 2007/0174429 | A1 * | 7/2007 | Mazzaferri et al. | 709/218 |
| 2007/0179955 | A1 * | 8/2007 | Croft et al. | 707/9 |
| 2007/0180447 | A1 * | 8/2007 | Mazzaferri et al. | 718/1 |
| 2007/0180448 | A1 * | 8/2007 | Low et al. | 718/1 |
| 2007/0180449 | A1 * | 8/2007 | Croft et al. | 718/1 |
| 2007/0180450 | A1 * | 8/2007 | Croft et al. | 718/1 |
| 2007/0186212 | A1 * | 8/2007 | Mazzaferri et al. | 718/1 |
| 2007/0198656 | A1 * | 8/2007 | Mazzaferri et al. | 709/218 |
| 2007/0217409 | A1 * | 9/2007 | Mann | 370/389 |
| 2008/0282243 | A1 * | 11/2008 | Seguin et al. | 718/1 |
| 2009/0055507 | A1 * | 2/2009 | Oeda | 709/216 |
| 2009/0217162 | A1 * | 8/2009 | Schneider | 715/700 |
| 2010/0042720 | A1 * | 2/2010 | Stienhans et al. | 709/226 |

OTHER PUBLICATIONS

Anderson, O.T. et al., "Global Namespace for Files", IBM Systems Journal, vol. 43, No. 4, 2004.
Barham, P. et al., "Xen and the Art of Virtualization", ACM SOSP'03, Oct. 2003.
Chase, J. et al., "Managing Energy and Server Resources in Hosting Centers", downloaded May 19, 2008.
VMware Consolidated Backup, http://www.vmware.com/products/vi/consolidated_backup.html., downloaded May 20, 2008.
Dell Unified Manageability Architecture, Oct. 30, 2006.
Heath, T. et al., "Energy Conservation in Heterogenous Server Clusters", ACM PPoPP'05, Jun. 2005.
HP AssetCenter Software, http://h20229.www2.hp.com/products/ovacen/index.html, downloaded May 15, 2008.

(Continued)

*Primary Examiner* — Thomas Dailey

(57) ABSTRACT

A system for coordinating information between management entities includes management channels, management brokers and management agents. The management channels provide bidirectional communication between management entities. The management brokers implement coordination policies, and the management agents facilitate communication on the management channels.

8 Claims, 11 Drawing Sheets

(56) References Cited

OTHER PUBLICATIONS

HP OpenView Enterprise Discovery Software, http://h20229.www2.hp.com/products/oventd/index.html, downloaded May 15, 2008.
HP Role of IPMI, SMASH, and WS-Managment in HP Proliant remote server managment, http://h20000.www2.hp.com/bc/docs/support/SupportManual/c00714935/c00714935.pdf.
ACPI, Advanced Configuration & Power Interface, http://www.acpi.info/, downloaded May 19, 2008.
DMTF, Common Information Model (CIM) Standards, http://www.dmtf.org/standards/cim/, downloaded May 15, 2008.
DMTF, Web-Based Enterprise Management (WBEM), http://www.dmtf.org/standards/wbem/, downloaded May 15, 2008.
Intellegent Platform Management Interface, http://www.intel.com/design/servers/ipmi/, downloaded May 19, 2008.
OpenWBEM, http://www.openwbem.org/, downloaded May 15, 2008.
VMware, http://www.vmware.com/, downloaded May 15, 2008.
Isci, C. et al., "Live, Runtime Phase Monitoring and Prediction on Real Systems with Application to Dynamic Power Management", downloaded May 20, 2008.
Kong, J. et al., "CameraCast: Flexible Access to Remote Video Sensors", downloaded May 20, 2008.
Kravets, R. et al., "Application-Driven Power Management for Mobile Communication", downloaded May 20, 2008.
Lee, E.K. et al., "Petal: Distributed Virtual Disks", Proc. of 7th International Conf. on Architectural Support for Programming Languages and Operating Systems, 1996.
Li, H. et al., "VSV: L2-Miss-Driven Variable Supply-Voltage Scaling for Low Power", IEEE MICRO-36, 2003.
Lu, Y. et al., "Low-Power Task Scheduling for Multiple Devices", International Workshop on Hardware/Software Codesign p. 39-43, 2000.
Moore, J. et al., "Making Scheduling "Cool": Temperature-Aware Workload Placement in Data Centers", downloaded May 20, 2008.
Muntz, D., "Building a Single Distributed File System from Many NFS Servers", HPL-2001-176, Jul. 12, 2001.
Nathuji, R. et al., "VirtualPower: Coordinated Power Managment in Virtualized Enterprise Systems", ACM SOSP'07, Oct. 2007.
Pike, R. et al., "The Use of Name Spaces in Plan 9", downloaded May 15, 2008.
Pillai, P. et al., "Real-Time Dynamic Voltage Scaling for Low-Power Embedded Operating Systems", downloaded May 20, 2008.
Pike, R. et al., "Plan 9 from Bell Labs", downloaded May 15, 2008.
Shih, E. et al., "Wake on Wireless: An Event Driven Energy Saving Strategy for Battery Operated Devices", ACM MOBICOM'02, Sep. 2002.
Stoess, J. et al., "Energy Management for Hypervisor-Based Virtual Machines", http://www.usenix.org/event/usenix07/tech/full_papers/stoess/stoess_html/energy_mgmt_vms.html.
Sugerman, J. et al., "Virtualizing I/O Devices on VMware Workstation's Hosted Virtual Machine Monitor", USENIX Annual Technical Conference, Jun. 2001.
Understanding Inventory, Configuration and IT Asset Management, http://h20229.www2.hp.com/solutions/asset/swp/4aa0-6093enw_asset_swp.pdf, downloade May 15, 2008.
VMware Virtual Appliance, http://www.vmware.com/appliances/, downloaded May 20, 2008.
WMI Architecture, http://msdn.microsoft.com/en-us/library/aa394553 (printer).aspx, downloaded May 15, 2008.
Wright, C. P. et al., "Versatility and Unix Semantics in a Fan-Out Unification File System", downloaded May 15, 2008.
Zhang, Z. et al., "Designing a Robust Namespace for Distributed File Services", downloaded May 15, 2008.
Li, H. et al., "VSV: L2-Miss-Driven Variable Supply-Voltage Scaling for Low Power", IEEE MICRO-39, 2003.

* cited by examiner

COORDINATED MANAGEMENT IN VIRTUALIZED SYSTEMS USING MANAGEMENT BROKERS AND MANAGEMENT CHANNELS

BACKGROUND

Systems management typically includes a range of operations required to maintain system resources through their lifecycle phases, such as bring up phases, operation, failures/changes, and retire/shutdown phases. Tasks performed at each of these lifecycle phases include provisioning and installation of servers; monitoring performance and health of systems; security protection against viruses and spyware; runtime performance and resource management; backup protection against disasters; disk maintenance to improve performance; fault diagnostics and recovery; and asset management to track resources. With rising complexity and scale in today's enterprise systems, several of these management tasks have become non-trivial in computation, design, and in the number of execution steps performed. Further, although virtualization technology helps in managing data centers by providing isolation, consolidation, virtual machine (VM) mobility, and VM appliances, it however, also creates a new set of challenges to manageability as well.

As a result, there is a substantial growth in the development of manageability applications, and an adoption of automation software that reduces overall maintenance costs. Contemporary manageability solutions can be classified as hardware-based and software-based solutions. Examples of hardware-based solutions are those related to hardware monitoring, power management, thermal management, and diagnostics. These solutions are deployed in firmware either at the management processor or other hardware peripherals such as BIOS, smart disks, or sensors. Examples of software-based solutions are those related to provisioning, service level agreement (SLA) management, and file-based backup. These solutions are deployed at the host system, typically as user space programs.

While individual hardware and software-based management solutions have proved useful, their use in virtualized environments provides new challenges for three main reasons. First, since virtual machines are not the privileged entities running on a hardware platform, they typically lack the ability to access management hardware, since that requires certain privileges. This prevents them from carrying out virtual machine or application-specific management actions. Second, even with privileged access, since virtual machines are highly autonomous and usually run their own management policies, a coordination problem arises among multiple virtual machines because they may try to manage the underlying hardware platform with potentially different policies. Third, virtualization creates virtual resources, preventing virtual-machine-level management from taking care of tasks like inventory management, thereby further worsening the problem of hardware-software coordination.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Figure 1:
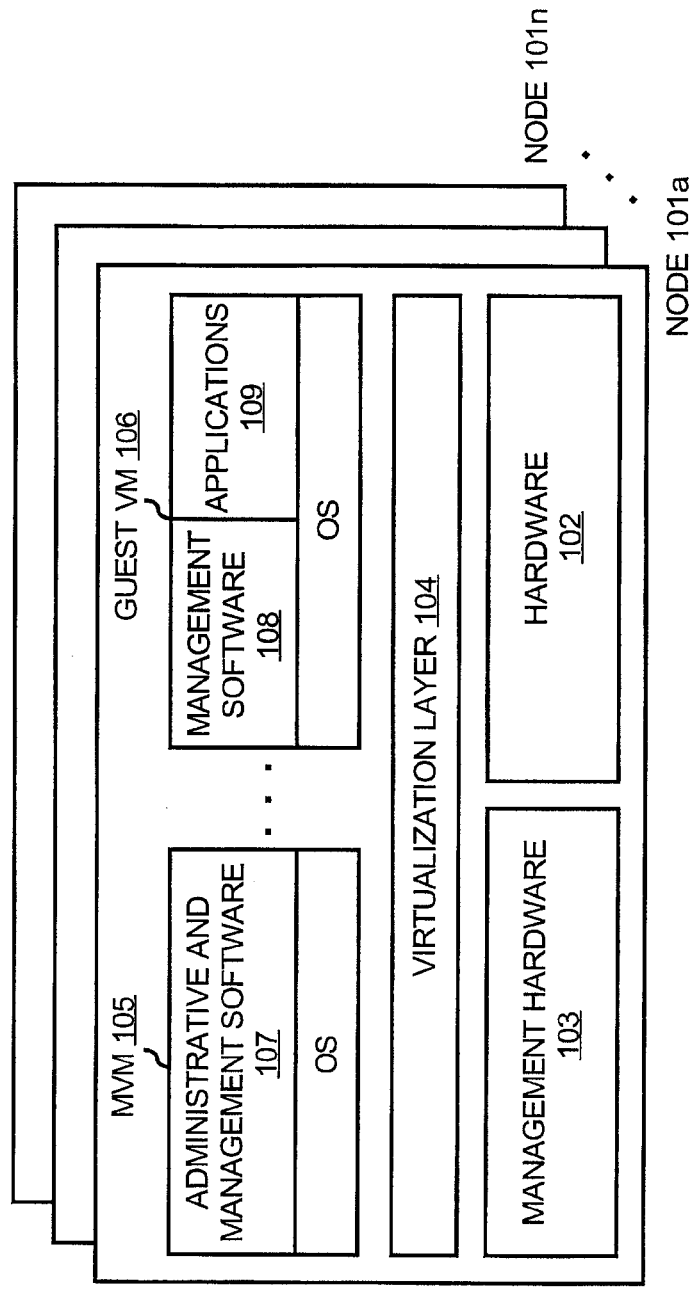
FIG. 1 illustrates a system, according to an embodiment.

FIG. 1 illustrates a system 100, according to an embodiment. The system 100 comprises a plurality of nodes 101a-n. Each node includes a set of resources comprising hardware and software that are allocated to run applications. The resources may be from a pool of resources in a resource-on-demand system. For example, resources from the pool are selected and allocated to a particular demand. The resources may be processors, memory, disks, software, etc., allocated to a demand or may be entire servers allocated to a demand.

As shown in FIG. 1, the nodes 101a-n provide virtualized environments to run host applications. As shown for node 101a, the nodes include hardware 102, such as processors, memory, disks, interfaces, etc. The hardware 102 stores and runs software described below, including VMs, operating systems, management applications, M-brokers, M-agents, etc. The nodes also include management hardware 103. Management hardware 103 may included a management processor, such as Hewlett-Packard's iLO/GSP and Intel's AMT (iLO stands for Integrated Lights Out, GSP stands for Guardian Service Processor, AMT stands for Active Management Technology). A management processor may communicate with processors/cores in the hardware 102 to receive information, for monitoring the processors and managing the processors. The management processor may include firmware for performing management functions on the processors, such as powering on or off or rebooting, monitoring temperature, power, and other attributes, and performing other management functions. The management hardware 103 may include other hardware, such as sensors, storage controllers, etc.

A virtualization layer 104 creates a virtualized environment for running virtual machines (VMs), such as the management VM (MVM) 105 and the guest VM 106. The virtualization layer allows multiple operating systems to be run on the hardware 102 at the same time. The virtualization layer 104 includes software for managing the VMs, including creating, starting, stopping and removing virtual machines from a hardware platform. One example of the virtualization layer 104 is the Xen hypervisor.

Each VM in the node 101a may include an operating system and applications. The MVM 105 is a special VM that includes administrative and management software 107 for managing guest VMs running on the hardware 102. The guest VM 106 runs management software application(s) 108 for managing the VM and communicating information with the MVM 105. The VM 106 also runs conventional applications 109, such as word processors, spreadsheets and other end-user applications. Multiple guest VMs and multiple MVMs may be run on each node.

In today's systems, individual management entities, which may include management software in a VM, operate within separate isolated environments and are non-coordinated among each other. For example, the individual management entities may be performing the same or different functions. The management entities, for example, may be performing power management at different levels or they may be performing different functions, such as power management and SLA management. In either case, the management entities may not be coordinated and in some cases cannot be coordinated because of lack of privileges, inability to communicate with different management entities, and inability to process information from other management entities. This leads to reduced management functionality and potential in-efficiency. According to an embodiment, management channels (M-channels) and management brokers (M-brokers) are used to coordinate among different management entities. Management entities in the embodiments may include the administrative and management software 107 in the MVM 105, the management software 108 in the guest VM 106, and the management hardware 103 including firmware. These entities may perform different and/or the same or similar functions. M-channels provide bi-directional information exchange among the hardware 102 and 103, VMs 106 and 107, and management software 107 and 108 and applications 109. M-brokers provide a framework for implementing coordination policies and leveraging information provided through M-channels.

Figure 2:
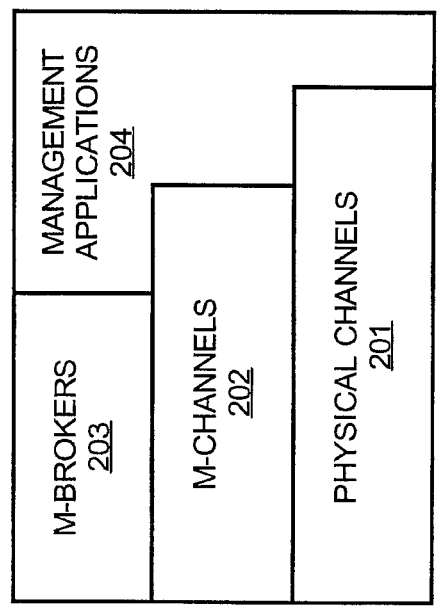
FIG. 2 illustrates a coordination stack with M-brokers and M-channels, according to an embodiment.

FIG. 2 shows the deployment stack with M-channels and M-Brokers. As shown in FIG. 2, M-channels 202 are built on top of existing physical channels 201, such as shared memory channels, sockets, and TCP/IP channels. M-brokers 203 use the M-channels 202 for communication and execution of coordination policies. The M-brokers 203 interact closely with existing management applications and enhance their functionality. The M-channels 202 and the M-brokers 203 do not prescribe how management tasks are carried out. This permits applications to either use one M-broker servicing multiple platforms or use distributed implementations where multiple M-broker instantiations cooperate to manage VMs and other tasks. Similarly, the M-channels 202 may carry simple monitoring data, like system provided information about current CPU usage, or they could be used for rich data and control exchanges between VMs and the management hardware and/or management software. In addition to the M-brokers 203, M-agents are also used to communicate information on the M-channels 202. The M-agents are described below. The management applications 204 perform the management tasks for the node, and may include the application and management software 107 on the MVM 108, management software 108 or applications 109 on the guest VM 106 or firmware on the management hardware 103.

Figure 3A:
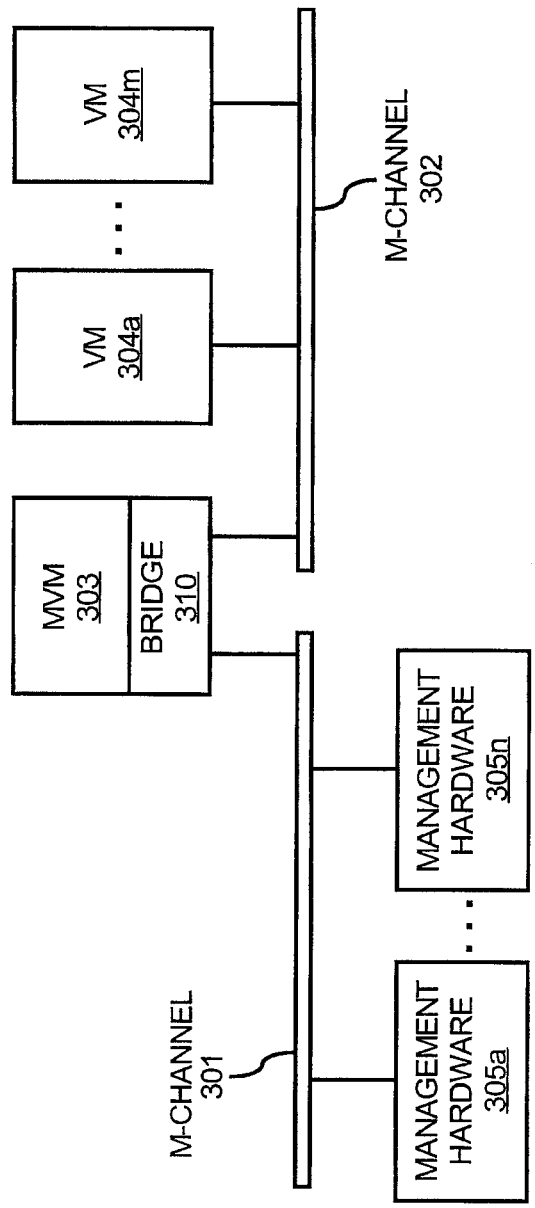
FIGS. 3A-B illustrate M-channels in a single system and in a distributed system, according to embodiments.
Figure 3B:
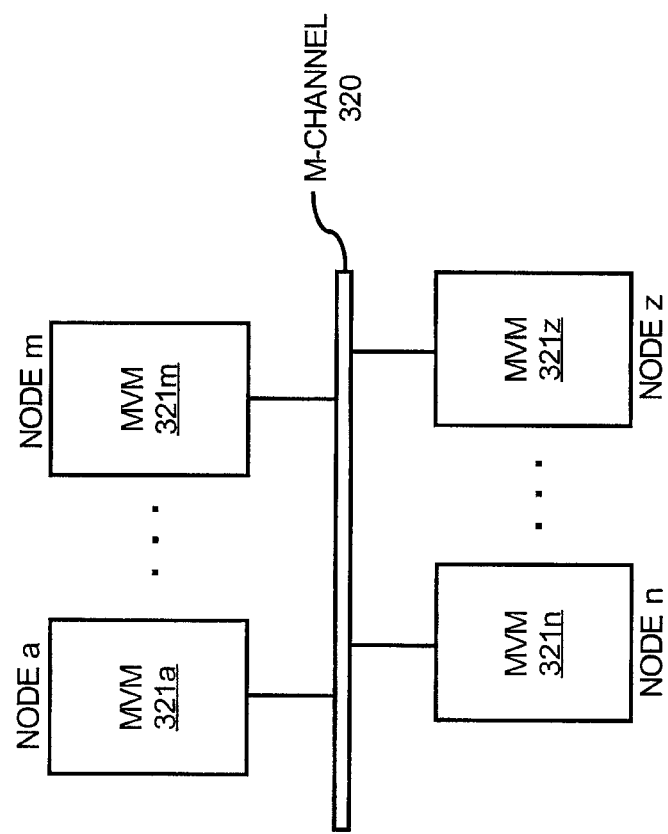

The M-channels 202 are special inter-VM and intra-VM communication channels which transfer commands and information between the MVM 105 and other VMs, such as the guest VM 106, as well as between the MVM 105 and the management hardware 103. The M-channels 202 can be instantiated in a single system and in a distributed system context. FIGS. 3A-B illustrate the M-channels 202 in a single system, such as in a node, and the M-channels 202 in a distributed system, such as channels between nodes.

As shown in FIG. 3A, M-channels 301 and 302 are used in a single system, such as in a node. The M-channels 301 and 302 are used for communication among VMs, including VMs 304a-m and the MVM 303 and for communication between the management hardware 305 and the VMs. The VMs 304a-m may include guest VMs managed by the MVM 303. The management hardware 305 may include components 305a-n, such as management processors, sensors and storage controllers.

The M-channels also include a communication bridge 310 that redirects messages from one M-channel to the other according to a set of policies. The redirection is transparent to the sending and receiving management entities. The bridge 310 may be instantiated in an MVM, such as shown in FIG. 3A. The bridge 310 is operable to perform protocol conversion when forwarding messages to the receiving management entity. For example, the bridge 310 puts messages from the VMs 304a-m or the MVM 303 in a format understood by a management processor in the management hardware 305 and vice versa. Also, the bridge 310 may implement trust policies. For example, trust policies may define which of the VMs 304a-m and MVM 303 are allowed to communicate with the management hardware 305 to prevent malicious VMs from causing failures in the node. Also, the bridge 310 may perform flow control to maintain a predetermined quality of service (QoS). For example, the management processor may be able to process messages at a predetermined rate. In certain situations there may be a high rate of interactions between VMs and management hardware, such as when monitoring for failures. The bridge 310 may cache messages being sent to a management processor to accommodate the message processing rate of the management processor.

FIG. 3B illustrates an M-channel 320 in a distributed system. The M-channel 320 is used for exchanging information among the MVMs 321a-n in nodes a-z.

In either a single system or in a distributed system, the M-channels may be bi-directional and can be used for exchanging both control information and actual data. For VM migration, the M-channels may support dynamic disconnection and reconnection between VMs and MVMs. Also, for flexibility, the M-channels may deliver messages using both point-to-point and broadcast or multicast protocols. Similarly, delivery of messages can be synchronous or asynchronous depending on the application being supported. Asynchronous messaging may be used when streaming monitoring data on a continuous basis. The underlying physical channels for the M-channels may be physical channels already existing in the system.

Challenges in realizing M-channels are caused by their use in different settings and for different management strategies. For instance, since M-channels must continue to operate even when VMs migrate between different computing platforms, they must be capable of using message-based data transports. At the same time, potentially high rate interactions between VMs and management hardware when monitoring for failures in reliability management require an implementation enabling substantial data exchanges between VMs and MVMs. Thus, the M-channels may be implemented using multiple methods.

M-channels between MVMs and management hardware can be implemented by using a device driver in an MVM which handles the particular management hardware and exports device specific interfaces to M-brokers. The M-channels between VMs and MVMs may be implemented using MVM-provided inter-domain communication channels. These channels typically use shared memory communication with very good latency characteristics that could enable management applications to react quickly to various notifications. In another example, the M-channels can be implemented over the network, for example, using socket application program interfaces (APIs). This is also an explicit communication channel and hence a generic solution to be used with management agents. This solution, however, has higher latency compared to shared memory communication. This solution, however, enables M-channels to span multiple physical machines creating M-channels between MVMs running on different nodes. M-channels may also be provided between management hardware components, and can be built on top of the Intelligent Platform Management Interface (IPMI) standard.

Table 1 below shows a list of APIs that may be used by M-channels to communicate between VMs, including communication between MVMs and VMs over a shared memory channel. These APIs may also be used to communicate between management hardware and MVMs. The APIs are divided into the phases of discovery, connection establishment, message communication, and connection termination.

TABLE 1

M-Channel APIs

| API | Return Value |
|---|---|
| discover(app_name) | List of agents ids {ids} |
| wait_on_discover(app_name component_id) | The broker id-broker_id |
| open(id, DELIVERY_TYPE, PHY_CHANNEL) | Connection descriptor-conn_desc |
| open_bcast(PHY_CHANNEL) | Connection descriptor-conn_desc |
| Open_mcast(MCAST_GROUP{ids},, PHY CHANNEL) | Connection descriptor-conn _desc |
| send(conn_dec, msg_type, msg) | non-blocking send, is success or failure return |
| receive(conn_dec, msg_type, msg) | Blocking receive into msg, is successor failure return |
| close(conn_desc) | Success or failure |

As described with respect to FIG. 2, M-brokers are used as policy managers that execute coordination policies and leverage information received through M-channels. Coordination is between management hardware and management applications (e.g., software 107, 108 and 109 shown in FIG. 1), as well as across VMs. A given system may have several M-brokers. An M-broker may be provided for each management application, which may include a management application running on an MVM or a guest VM. Furthermore, M-brokers may be provided on management hardware. In addition to executing coordination policies, the M-brokers may also provide a bridge, such as the bridge 310 shown in FIG. 3A, allowing communication between management hardware and management applications.

The M-broker and M-agents, which are described below, may be implemented as software stored on a computer readable medium and executed by hardware. The M-brokers and M-agents may be application-specific and may be implemented in the kernel level as well as the user level. In one embodiment, the M-brokers and M-agents are implemented as multi-threaded applications. The actual management application-specific broker code is implemented as a thread in the application. The M-brokers and M-agents are multi-threaded because they communicate with multiple entities which usually operate independently of each other (e.g., management hardware, policy maker, M-channel, etc.). Different threads of the M-broker handle the communication with other VMs, management hardware and decision making, algorithms. These M-brokers communicate with other M-agents and M-brokers on local machines using shared memory M-channels and with M-brokers on other machines using socket-based M-channels. To access the management hardware, an M-broker may utilize a driver-provided M-channel interface to read from and write to the device. The M-broker's interface to M-channels may also operate as the communication bridge 310 of FIG. 3A between the VMs and the management hardware. In this case, all the accesses to the management hardware from VMs must go through the M-broker.

Figure 4:
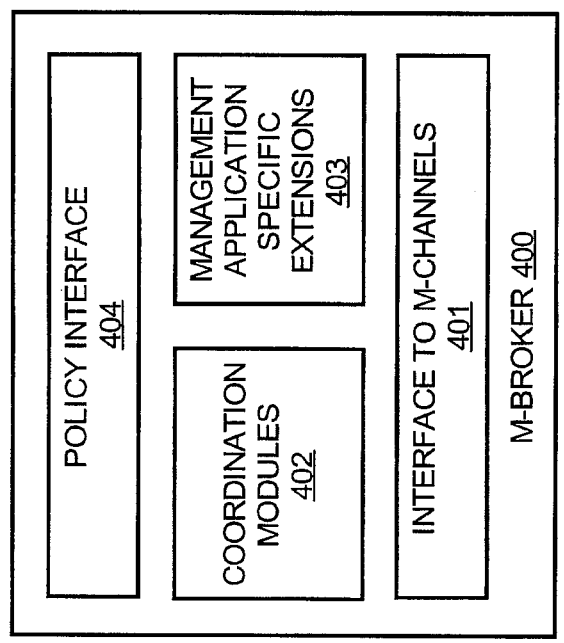
FIG. 4 illustrates an M-broker, according to an embodiment.

FIG. 4 shows the structure of an M-broker 400, according to an embodiment. The structure of the M-broker 400 shown in FIG. 4 may be used as a model for systematic development of M-brokers. The M-broker 400 includes an interface 401 to the M-channels, coordination modules 402, management application specific extensions 403 and a policy interface 404. The interface 401 may include the M-channel APIs shown in table 1. The interface 401 allows the M-broker 400 to communicate with other M-brokers and M-agents on the M-channels. The M-channel coordination modules 402 include protocols for message exchange between M-brokers and M-agents. In addition, the M-channel coordination modules 402 along with the extension modules 403 include the coordination policies and decision engine for making decisions based on coordination policies and received data.

Some examples of coordination polices relate to power management and storage backup. For example, for storage backup, a VM tracks disk activity and an M-agent running on the VM sends disk activity to an M-broker running on an MVM via an M-channel. The coordination module in the M-broker uses the information to create a replica by writing modified blocks to a replicated disk in parallel. This is one example of an actuation performed by the M-broker in response to the received information. In another example, the M-broker monitors for disk failures. In another example, a management application monitors activity for a VM and an M-agent for the management application sends the activity information to an M-broker via an M-channel. Based on a coordination policy, if activity is greater than or less than a threshold, the power state (e.g., frequency and voltage scaling) of a processor running the VM may be changed. For example, the M-broker sends an actuation command to change the power state to a management processor via an M-channel, and the management processor controls the processor to change the power state. These are just some examples of coordination policies that may be implemented using an M-broker.

Some core coordination modules may implement the basic protocol for communication among the M-brokers and the M-agents. Also, the coordination modules 402 may be reused by all M-brokers for different management applications. The management application specific extensions 403 comprise code for implementing coordination polices with specific applications. The extensions 403 may include APIs for specific applications. The policy interface 404 provides an interface for receiving policies and storing policies. For example, the policy interface 404 receives policies from a policy maker described in further detail below.

Closely tied with M-brokers are M-agents. An M-agent is software that interacts with existing management applications and serves as a proxy for sending management information to other M-agents and M-brokers. Unlike M-brokers, however, an M-agent does not execute any coordination modules. As such, the M-agent is responsible for monitoring, passing information and receiving actuation commands.

Figure 5A:
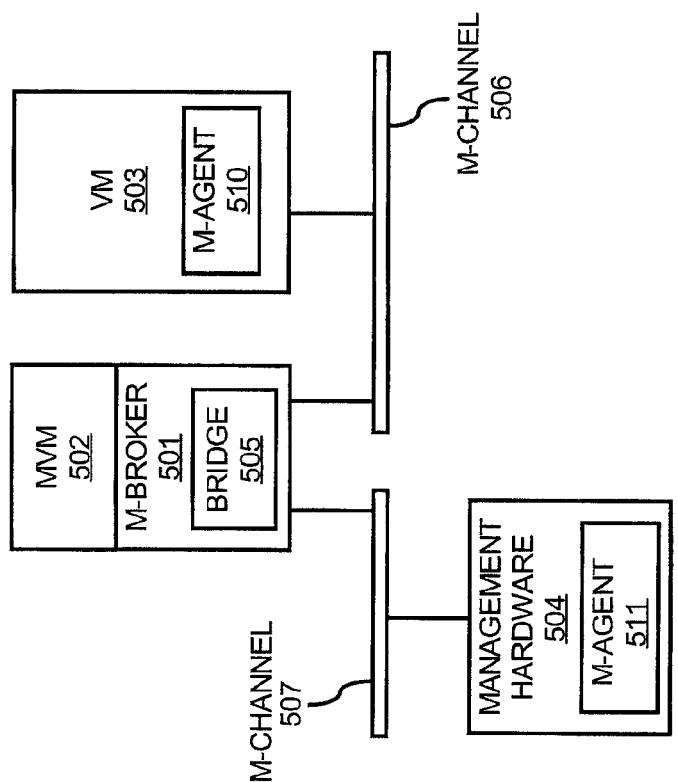
FIGS. 5A-C illustrate different deployment strategies for M-brokers, according to embodiments.
Figure 5B:
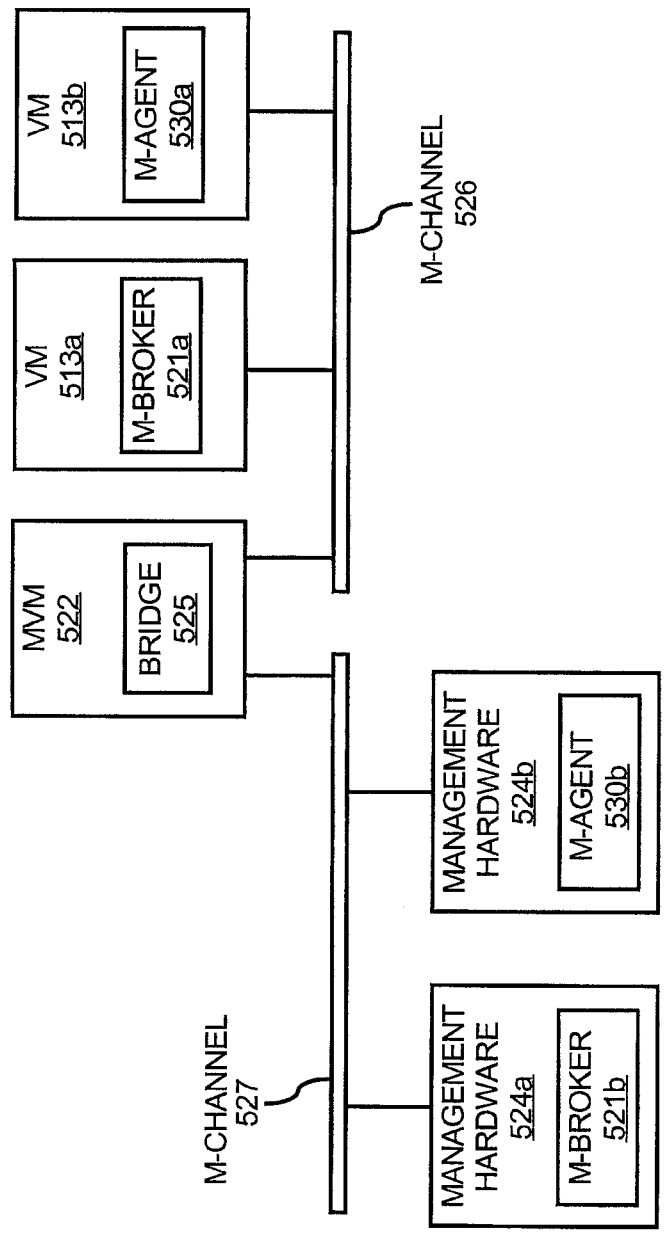
Figure 5C:
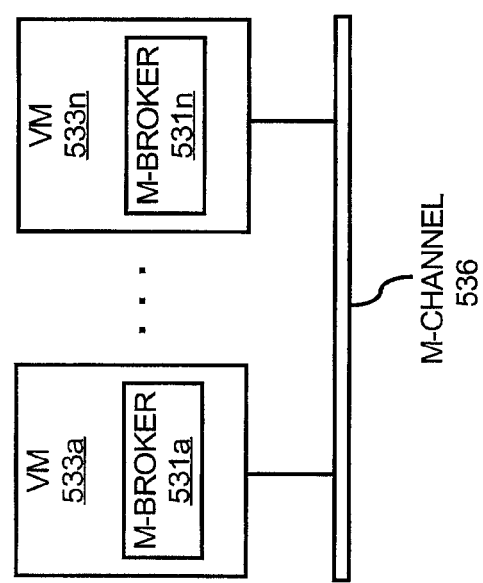

M-brokers can be instantiated with different deployment strategies. FIGS. 5A-C illustrate embodiments for deploying M-brokers in a single system and a distributed system. FIG. 5A shows an M-broker 501 in a single system providing a communication bridge 505, e.g., which may be the same as the communication bridge 310 shown in FIG. 3. The M-broker 501 is in an MVM 502 and communicates with M-agents 510 and 511 in the VM 503 and the management hardware 504 respectively via M-channels 506 and 507. The M-broker 501 provides coordination between firmware in the management hardware 504 and management applications in the MVM 502 and the VM 503.

FIG. 5B shows an M-broker 521a residing in a VM 513a and an M-broker 521b residing at the management hardware 524a. In this case, the M-brokers 521a-b provide coordination polices that are implemented at the management hardware 524a and management applications at the VM 513a. Another VM 513b may include an M-agent 530a, and another hardware component 524h of the management hardware may include an M-agent 530b. An MVM 522 includes a communication bridge 525 for providing bi-directional communication on the M-channels 526 and 527 between the management hardware 524a-b and the MVM 522 and the VMs 513a-b, FIG. 5B may represent components in a single node. Also, FIG. 5B shows an M-broker in management hardware and a guest VM. However, an M-broker may only be provided in management hardware, may only be provided in one or more guest VMs, or may be provided in both management hardware and a guest VM. In addition, as shown in FIG. 5A, the M-broker may be provided only in an MVM. Also, the M-broker(s) may be provided in any combination of an MVM and one or more of management hardware and a guest VM.

FIG. 5C shows a system where M-brokers 531a-n are distributed across VMs 533a-n. The VMs 533a-n may be in a single node or distributed across multiple nodes. The M-channel 536 may include one or more M-channels for a distributed system and/or a single system. The M-brokers 531a-n communicate and jointly make coordination decisions based on stored coordination policies.

Figure 6:
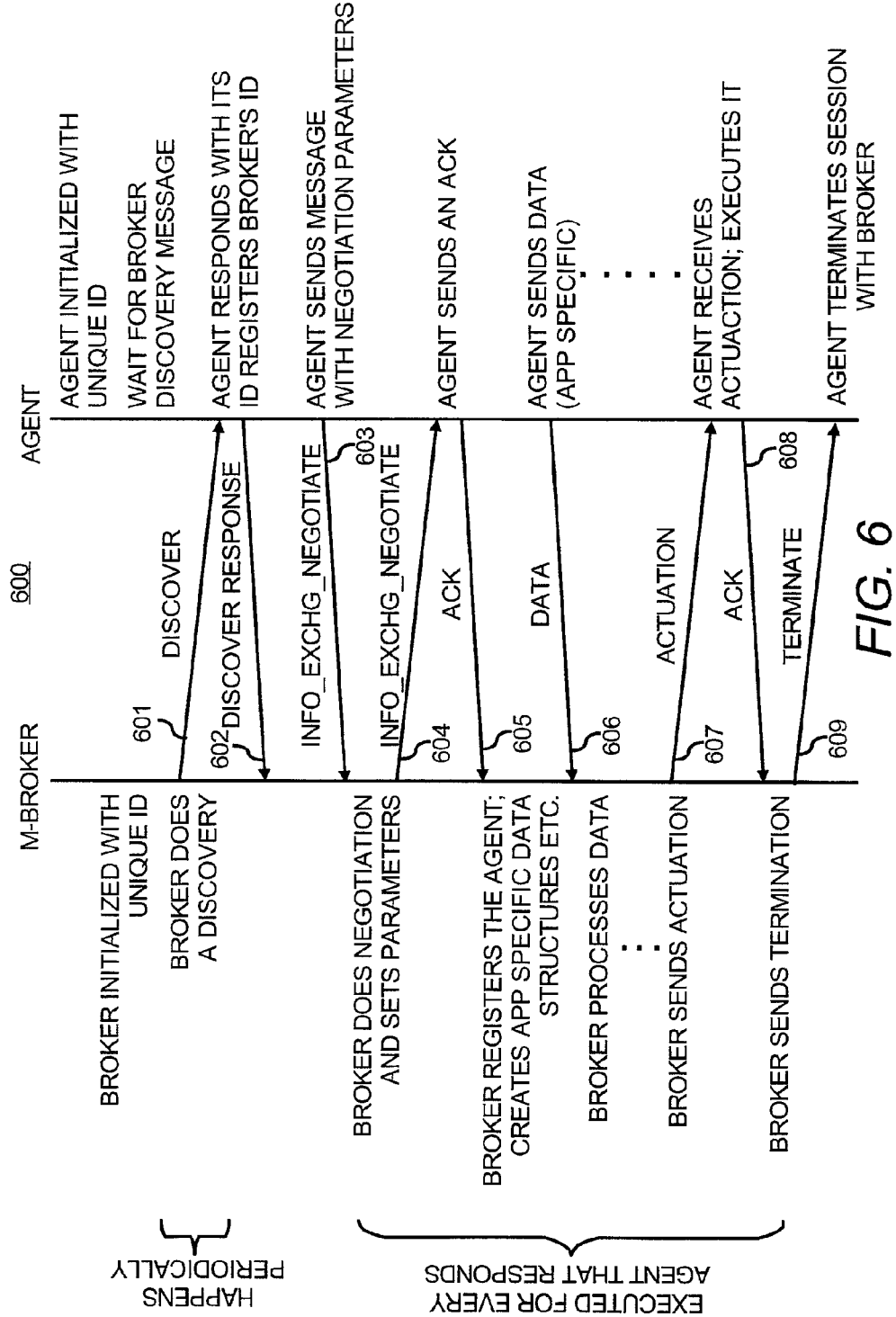
FIG. 6 illustrates message exchange between an M-broker and an M-agent, according to an embodiment.

In FIGS. 5A-C, the M-brokers and M-agents periodically exchange messages for purposes of coordination. As mentioned above, these messages are exchanged using M-channels. A well-defined application-level protocol may be used by the M-brokers and the M-agents to perform information exchange, coordination, and actuation. FIG. 6 shows an example of a timeline of message exchanges 600 between an M-broker and an M-agent, according to an embodiment. The messages in FIG. 6 are annotated with the message types and illustrates the control commands that may be used for the message type field in M-channel APIs.

The messaging in FIG. 6 includes message exchanges for phases of discovery, communication establishment, message exchange, and connection termination. The messaging in FIG. 6 may be applied between M-brokers, between M-agents, as well as between M-brokers and M-agents. Messages 601-602 are for discovery. Messages 603-605 are for session establishment, including negotiation of parameters for establishing and maintaining a session. Messages 606-608 include data exchange and actuation commands. For example, an M-broker receives power consumption information from a management application and based on a coordination policy instructs the M-agent to perform frequency scaling for a processor to reduce power consumption. After acknowledgement (e.g., message 608) that the actuation was performed, the session is terminated using message 609.

The addressing among the M-brokers and the M-agents takes place using a unique identifier associated with each of them, according to an embodiment. The addressing applies to both hardware and software components, and uniquely identifies components over a distributed system. The identifier comprises a tuple <Component ID, App ID> as the identifier. For the M-agent or the M-broker in the hardware component, <Component ID> may correspond to the machine serial number. For the M-agent or M-broker in a VM, <Component ID> may correspond to the <MVM IP, VM ID> where the MVM IP is the IP address of the MVM and the VM ID is the unique virtual machine ID assigned by the MVM to the VMs in the system including itself. App ID is the unique name given to a management application (e.g., power management, backup storage management, inventory management, etc.) for which coordination is being performed. The App ID may be uniquely assigned by a system administrator.

Figure 7:
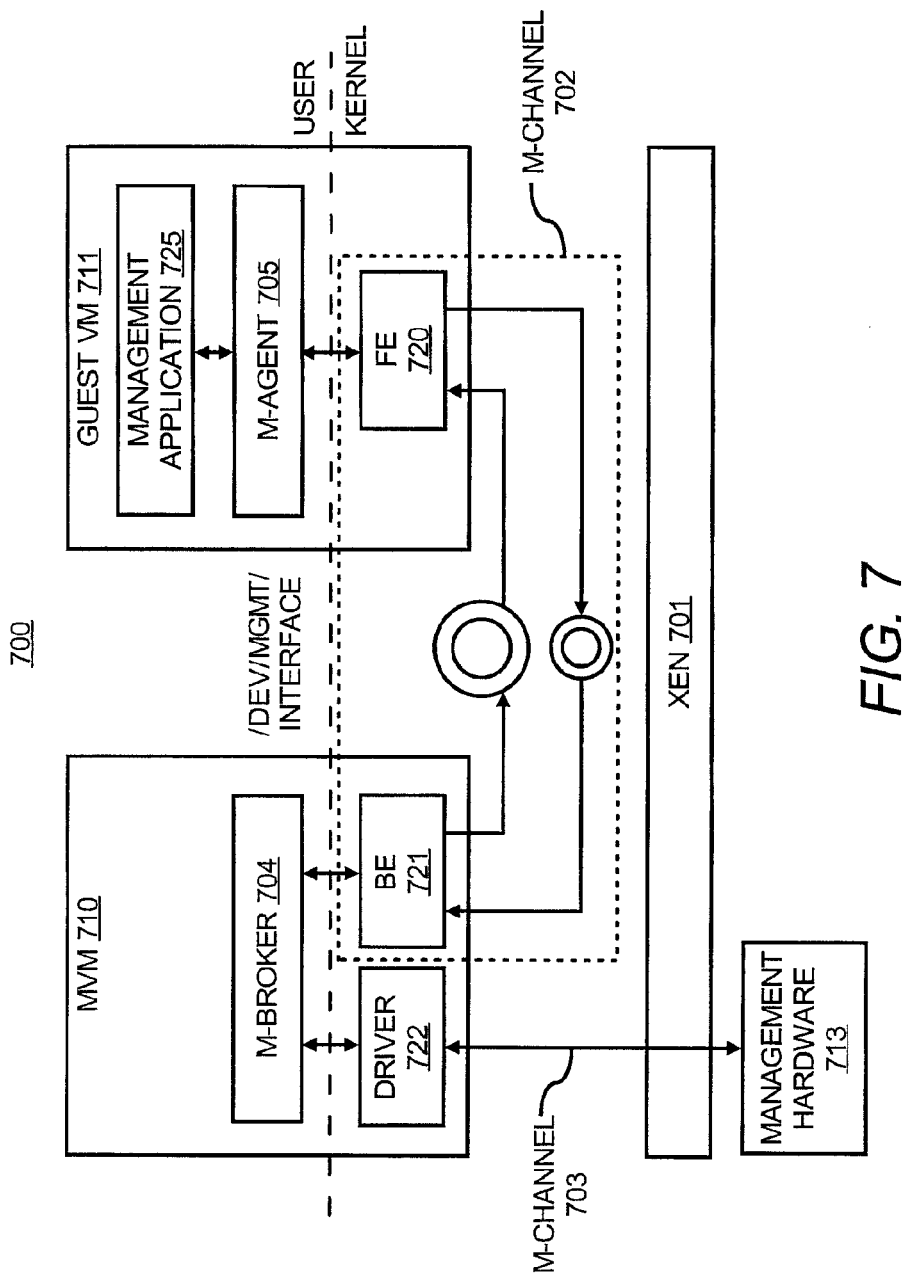
FIG. 7 illustrates an implementation of M-channels and M-brokers, according to an embodiment.

FIG. 7 shows an implementation 700 of M-brokers, M-agents, and M-channels in a system, according to an embodiment. This implementation is a Xen implementation. That is, Xen is used at the virtualization layer 104 shown in FIG. 1. It will be apparent to one of ordinary skill in the art that other virtualization layers may be used.

FIG. 7 shows a Xen virtualization layer 701, M-channels 702 and 703, an M-broker 704 in an MVM 710 and an M-agent 705 in a guest VM 711. The M-broker 704 and the M-agent 705 on the VM 711 include user-based and kernel-based interfaces to the M-channels 702 and 703.

The two different implementations of M-channels are used for inter-VM communication depending on whether the VMs are on the same machine or on a different machine in a network. The M-channel 702 between local VMs 710 and 711 utilize the inter-domain communication APIs provided by Xenbus to provide shared memory communication. A management frontend (FE) module 720 runs inside the guest VM 711 kernel and communicates with a management backend (BE) module 721 inside the MVM 710 kernel. The FE module 720 and the BE module 721, which are part of the interfaces to the M-channel 702, represent the M-channel endpoints for the guest VM 711 and the MVM 710 respectively. The communication on the M-channel 702 is asynchronous and hence uses two different communication rings for the two directions send and receive). When the FE module 720 loads, it allocates pages of shared memory for the two rings and shares the pages with the backend. If the sent or received data size is more than the ring element size, the data is passed by sharing the page containing the data and passing pointers to it. A typical M-channel ring data element includes three fields: an M-channel header, followed by an application-specific header, and followed by application specific data if any. This design creates a generic, simple and yet flexible infrastructure for transferring management related messages between VMs. It should be noted that the M-broker or M-agent may be provided in the virtualization layer, such as the virtualization layer 701, or in the application layer of a virtual machine.

Both the FE module 720 and the BE module 721 export a file interface, such as /dev/mgmt in Xen, to the user-level M-broker 704 and the M-agent 705 and the management application 705 if needed. An API interface may also be used, such as the APIs in table 1.

The M-channel 702 also enables the M-brokers and M-agents to coordinate over VM migrations. For example, during a VM migration of the guest VM 711 to another platform, the FE module 720 and the BE module 721 get notified of the VM migration event which triggers a new set of disconnections and reconnections. For example, the BE module 721 breaks its connection with the FE module 720 and a new FE module for the new M-channel on the new platform establishes a new connection with a BE module for a new MVM. This enables the M-agents and M-brokers inside guest VMs to remain transparent to migration and still be able to communicate with the current platform's M-broker in an MVM.

The M-channel 703 connected to the management hardware 713 may be implemented as a device driver 722 which communicates with a management hardware communication interface, such as a PCI interface in the case of a management processor. The driver 722 also exports a file interface and API interface (similar to shared memory M-channels) and provides the same basic interfaces as the VM-to-VM M-channel 702.

For distributed M-channels, a socket-based communication interface which provides the same APIs as the shared-memory-based implementation, is used. Specifically, all the M-channel endpoints run a TCP/IP server which listens on a well-known port and accepts connections from other M-channel endpoints. While currently not implemented, authentication mechanisms can be used to implement to establish secure channels between different VMs. In both implementations, the application-specific M-agents and M-brokers define their own message formats for M-channels which provides flexibility to the management applications.

An M-channel communication bridge between the FE module 720 and the BE module 721 is implemented as part of the BE module 721 and routes messages based on the address contained in the M-channel header. Similarly the bridge between the VMs 710 and 711 and the management hardware 713 is implemented as part of the M-broker 704 inside the MVM 710 and routes messages between them according to its policies (e.g. pass-though vs. virtualized access).

The MVM 710 is a privileged management VM which is the dedicated point to control all management tasks on a single platform, such as a single node. The MVM 710 coordinates between application requirements and platform management policies with the help of specific management hardware and inputs from applications running on the VMs, such as the management application 725 running on the guest VM 711.

The MVM 710 includes three main components not shown: (1) one or more M-brokers, (2) a high-level policy maker which creates the policies in the coordination modules in the M-brokers, and (3) M-channel interfaces. The policy maker is a management application that runs inside the MVM 710 and provides the system administrator with access to various policy controls. The policy maker can set the policies and goals for the M-broker and provide the status of management actions to the system administrator. The MVM 710 is a privileged and trusted VM with direct access to platform's hardware which sense and actuate useful management actions (e.g., the management hardware 713 including a management processor, sensors, a memory controller, etc.).

Figure 8:
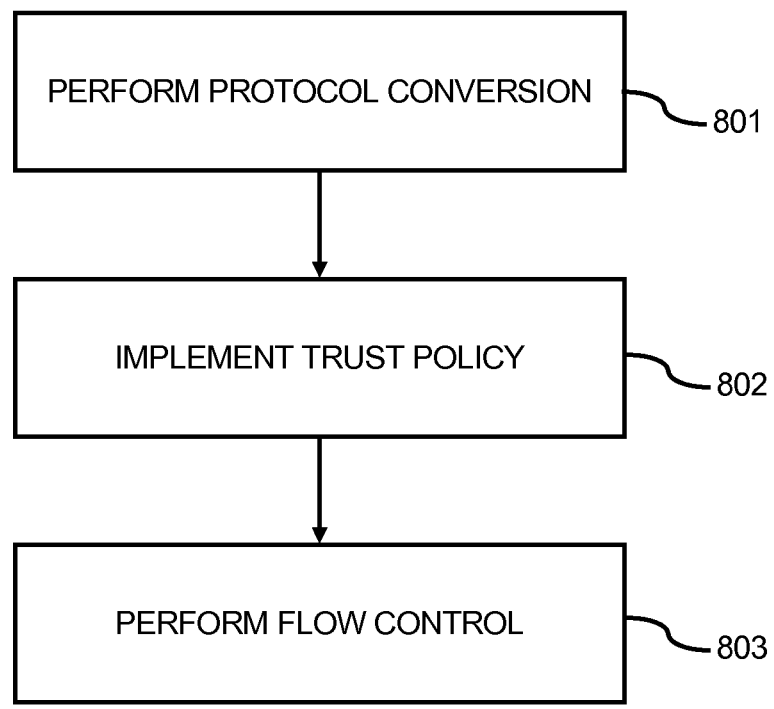
FIG. 8 illustrates a flow chart of a method for a communication bridge, according to an embodiment.

FIG. 8 is a method performed by a communication bridge, according to an embodiment. The communication bridge may include the communication bridge 310 shown in FIG. 3A. However, the bridge may be provided in a VM or management hardware.

At step 801, the bride performs protocol conversion. For example, the bridge receives a first message from a management entity. The management entity may include a management application running on a VM, an MVM or management hardware or corresponding management applications or firmware running on the MVM or management hardware respectively.

The first message uses a first protocol to communicate on a particular M-channel. For example, if the message is from the VM 304a shown in FIG. 3A to the MVM 303, the message may used a shared memory protocol for communication on the M-channel 302. The bridge converts the message to a second protocol. For example, the bridge 310 converts the message to a PCI protocol for transmission to the management hardware 305a on the M-channel 301.

At step 802, the bridge implements a trust policy. For example, trust policies may define which of the VMs 304a-m and MVM 303 shown in FIG. 3A are allowed to communicate with the management hardware 305 to prevent malicious VMs from causing failures in the node.

At step 803, the bridge 310 performs flow control. Flow control includes controlling the flow of messages between VMs including MVMs and between VMs and management hardware. Flow control may be implemented to maintain a predetermined QoS.

While the embodiments have been described with reference to examples, those skilled in the art will be able to make various modifications to the described embodiments without departing from the scope of the claimed embodiments.

What is claimed is:

1. A system for coordinating information between management entities, the system comprising:
 a processor and memory;
 management hardware for running at least one of the management entities;
 at least one management channel built on top of a physical channel and providing bidirectional communication of control information and data between the management entities, wherein one or more of the management entities include a management application running on a virtual machine, the at least one management channel including a front-end module running on the virtual machine and a back-end module running on a management virtual machine;
 at least one management broker implementing a coordination policy for coordinating information from one or more of the management entities and making actuation decisions based on the information and the coordination policy;
 at least one management agent communicating information from the management application on the at least one management channel for transmission to the at least one management broker; and
 machine-readable instructions stored in the memory and executed by the processor to:
  disconnect the front-end module of the virtual machine and the back-end module of the management virtual machine, and
  connect a new front-end module of a new virtual machine and a new back-end module of a new management virtual machine, wherein the disconnecting and the connecting are transparent to any management agent and any management broker running on the virtual machine.

2. The system of claim 1, wherein the one or more management entities may be provided in one or more of hardware, software and virtual machine layers.

3. The system of claim 1, wherein the machine-readable instructions are executed by the processor to send a discovery message from the at least one broker to discover the at least one agents.

4. The system of claim 3, wherein the machine-readable instructions are executed by the processor to identify the at least one broker and the at least one agent with hierarchal addressing during discovery and for other communications.

5. The system of claim 4, wherein the hierarchal addressing comprises:

unique identifiers, each including a tuple <Component ID, App ID>, wherein Component ID corresponds to hardware, an IP address or a virtual machine identifier, and App ID is a management application identifier.

6. A management processor configured to perform management functions for one or more processors in a system, the management processor comprising:
- a processor operable to perform the management functions;
- memory storing machine readable instructions to perform the management functions;
- a management broker including a coordination module to implement a policy for managing the one or more processors based on information received from a management application running on a virtual machine hosted by the one or more processors; and
- an interface connecting the management processor to a management channel built on top of a physical channel and providing bi-directional communication of control information and data with the virtual machine,
  wherein the machine-readable instructions are executed by the processor to:
    disconnect the front-end module of the virtual machine and the back-end module of the management virtual machine, and
    connect a new front-end module of a new virtual machine and a new back-end module of a new management virtual machine, wherein the disconnecting and the connecting are transparent to any management agent and any management broker running on the virtual machine.

7. The system of claim 1, wherein the machine-readable instructions are executed to:
- receive a first message from the virtual machine;
- convert the first message to a protocol understood by a management processor managing one or more processors hosting the virtual machine;
- receive a second message from the management hardware; and
- convert the second message to a protocol understood by the virtual machine.

8. The management processor of claim 6, wherein the machine-readable instructions stored in the memory and executed by the processor to:
- receive a first message from the virtual machine;
- convert the first message to a protocol understood by a management processor managing one or more processors hosting the virtual machine;
- receive a second message from the management hardware; and
- convert the second message to a protocol understood by the virtual machine.

* * * * *